(12) United States Patent
Shi (10) Patent No.: US 8,539,061 B2
(45) Date of Patent: Sep. 17, 2013

(54) SYSTEMS AND METHODS FOR WEB SERVICE ARCHITECTURES

(75) Inventor: Xuan Shi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 146 days.

(21) Appl. No.: 13/119,962

(22) PCT Filed: Sep. 21, 2009

(86) PCT No.: PCT/US2009/057739
§ 371 (c)(1),
(2), (4) Date: Mar. 19, 2011

(87) PCT Pub. No.: WO2010/033950
PCT Pub. Date: Mar. 25, 2010

(65) Prior Publication Data
US 2011/0179007 A1    Jul. 21, 2011

Related U.S. Application Data

(60) Provisional application No. 61/098,347, filed on Sep. 19, 2008.

(51) Int. Cl.
*G06F 15/16*   (2006.01)
(52) U.S. Cl.
USPC .............................. 709/223; 709/224; 709/246
(58) Field of Classification Search
None
See application file for complete search history.

(56) References Cited

U.S. PATENT DOCUMENTS

| | | | | |
|---|---|---|---|---|
| 7,428,582 | B2 * | 9/2008 | Bean et al. | 709/218 |
| 7,987,163 | B2 * | 7/2011 | Keshavarz-Nia et al. | 707/694 |
| 8,239,820 | B1 * | 8/2012 | White et al. | 717/101 |
| 8,346,929 | B1 * | 1/2013 | Lai | 709/226 |
| 2002/0143819 | A1 * | 10/2002 | Han et al. | 707/513 |
| 2003/0061404 | A1 * | 3/2003 | Atwal et al. | 709/328 |
| 2004/0068731 | A1 | 4/2004 | Davis et al. | |
| 2006/0277606 | A1 | 12/2006 | Yunus et al. | |
| 2007/0168479 | A1 * | 7/2007 | Bean et al. | 709/223 |
| 2007/0233457 | A1 * | 10/2007 | Kang et al. | 704/8 |
| 2008/0059643 | A1 | 3/2008 | Moss | |
| 2008/0133751 | A1 * | 6/2008 | Lei et al. | 709/224 |
| 2008/0195601 | A1 * | 8/2008 | Ntoulas et al. | 707/5 |
| 2009/0216884 | A1 * | 8/2009 | Larvet | 709/226 |

OTHER PUBLICATIONS

Vermal et al., "METEOR-S WSDI: A Scalable P2P Infrastructure of Registries for Semantic Publication and Discovery of Web Services," Journal of Information Technology and Management, 2005.*
International Search Report and Written Opinion dated Apr. 14, 2011 for related PCT Application No. PCT/US2009/057739.

* cited by examiner

*Primary Examiner* — Sangwoo Ahn
(74) *Attorney, Agent, or Firm* — Ryan A. Schneider, Esq.; Troutman Sanders LLP (57) ABSTRACT

Web service registry systems and methods, and web service architectures are disclosed. A web service registry system can include a web service registry, a plurality of web services, a plurality of knowledgebase models, and a control system. The plurality of web services can be published to the web service registry for effective dynamic discovery and invocation of the web services. The plurality of knowledgebase models, which can be defined by domain knowledge experts, can be associated with the web service registry. Each of the knowledgebase models can include a semantic specification and a syntactic specification. The control system can periodically filter non-compliant web services from the web service registry, where a non-compliant web service fails to comply with a predetermined knowledgebase model associated with the web service registry. Other embodiments of the web service management systems, architectures, and methods are also disclosed.

11 Claims, 4 Drawing Sheets

SYSTEMS AND METHODS FOR WEB SERVICE ARCHITECTURES

CROSS-REFERENCE TO RELATED APPLICATIONS

This application claims a benefit, under 35 U.S.C. §119(e), of U.S. Provisional Application Ser. No. 61/098,347, filed 19 Sep. 2008, the entire contents and substance of which is hereby incorporated by reference.

TECHNICAL FIELD

Various embodiments of the present invention relate to web services and, more particularly, to interactive web service architectures and web service registry systems.

BACKGROUND

A web service provides either an application programming interface ("API") or a Uniform Resource Locator ("URL") to enable a Remote Procedure Call ("RPC") over a network. Web services are generally described by the Web Service Definition Language ("WSDL"). WSDL defines the syntactic structure and content of a web service interface. Because service providers can develop web services in various manners according to their own desires, however, WSDL is inconsistent across different web services. For example, two web services providing the same function may provide different syntactic interfaces, as specified by WSDL. Further, two web services providing different functions may use the same syntactic interface, as described by WSDL. As a result, use of WSDL causes uncertainties in web service invocation, and a service user cannot effectively utilize a web service without knowing the specific syntactic interface specified for the web service. Dynamic web service invocation, which is defined as invocation without reprogramming, provides the flexibility to select from various web services capable of performing the same job. Because of the current uncertainties in WSDL, dynamic web service invocation is not feasible.

Universal Description, Discovery, and Integration (UDDI) is an initiative for registering web services. A UDDI registry is designed for publishing web services created by various service providers. Service providers register their web services to the UDDI registry, where service requestors locate desired web services. Upon request from a service requestor for a web service, the UDDI registry provides the service requestor with information about the requested web service based on the syntactic interface defined in WSDL, and directs the service requestor to a service provider and location of the web service. Based on the information received from the UDDI registry, the service requestor consumes and invokes the web service directly from the service provider.

WSDL has been criticized as providing little semantic meaning about a web service. While a web service can be identified in a UDDI registry based on its syntactic interface defined in WSDL, it may be difficult to identify a web service based on its semantic meaning or purpose. As a result, web service discovery is difficult to implement under conventional methods.

Due to the semantic uncertainty in web services, which do not conventionally include semantic descriptions, service discovery is not effective with conventional methods. Further, due to the syntactic uncertainty, dynamic invocation is infeasible. Therefore, with conventional methods, the comprehensive goals of web services cannot be realized. Semantic web services, i.e., web services with defined semantics, have been the cutting-edge research front in both industry and academia with a comprehensive goal to enable the automatic and dynamic service discovery, matchmaking, composition, and invocation of web services.

SUMMARY

There is a need for a renovated web service architecture and registry system for more effectively identifying and using web services. In an exemplary embodiment, the needed web service management architecture can utilize standard semantic and syntactic specifications to supervise the lifecycle of web service development and deployment, thereby enabling web service discovery and improving the interchangeability of web services through dynamic service invocation. It is to such a web service architecture and registry system that various embodiments of the present invention are directed.

Briefly described, various embodiments of the present invention generally comprise web service architectures and web service registry systems and methods. A web service registry system according to an exemplary embodiment can comprise an ontological knowledgebase, a web service registry, and a control system.

In an exemplary embodiment, the knowledgebase can comprise a plurality of knowledgebase models. Each knowledgebase model can include a semantic specification and a syntactic specification for a type of web service. A semantic specification can define a concept and meaning of a web service, and can describe relationship with other web services. A syntactic specification can define a syntactic interface for a web service. A semantic specification and syntactic specification can be packaged together in a knowledgebase model for a web service. In that case, the semantic specification and the syntactic specification, although inherently independent, can correspond to each other and can be used in conjunction with each other in the web service architecture. The knowledgebase can be stored in a repository, such as a database, in association with the web service registry.

Within the web service registry, web services can be categorized and managed based on their knowledgebase models. In an exemplary embodiment, a service provider cannot freely publish web services to the web service registry, but must comply with a knowledgebase model for each published web service. If a service provider desires to register an instance of a web service, the service provider can search the registry to determine whether a knowledgebase model exists for the web service. If the service provider locates such a knowledgebase model, the service provider can develop or modify the web service instance to comply with the knowledgebase model. Multiple web service instances can be registered to the web service registry for each web service. Each "instance" of a web service can represent a different location and, in some cases, a different provider for receiving the web service.

The control system, or control service, can enforce the knowledgebase models by rejecting and removing web services that fail to comply with a knowledgebase model in the knowledgebase. The control system can determine whether a web service, for which registration is requested, complies with all predetermined criteria for the web service registry. Such criteria can include compliance with at least one of the knowledgebase models in the knowledgebase. The control system can reject web services that fail to comply with the predetermined criteria. The control system can also reject web services that are deemed inoperative. In an exemplary embodiment, the control system can examine web services, not only upon their submission to the web service registry, but also periodically to enforce the knowledgebase models and optional other criteria for registration.

The web service registry can provide one or more interfaces for interaction with service providers and service requestors, or users. Service providers and requestors can search the web service registry through one or more interfaces to identify web services or knowledgebase models of interest. When conducting a search, a service provider or requestor can provide a description of a desired web service.

In general, service providers can provide web services for publication in the web service registry. In an exemplary embodiment, a web service of a service provider complies with at least one of the plurality of knowledgebase models. Service requestors, in contrast, can search the web service registry for pre-registered web services to consume and invoke.

When searching for a web service or knowledgebase model, a service provider or requestor can enter a description of the desired web service into an interface of the web service registry. The desired web service can be effectively located by comparing the provided description of the desired web service to the semantic specifications of the web services in the web service registry. After a desired web service is located, the web service's knowledgebase model can be returned to the service provider or requester. A service provider can use the knowledgebase model to develop a web service of the same type as the desired web service, in accordance with the knowledgebase model. The interface of the web service registry can also return to locations of one or more registered instances of the desired web service. The service requester can then invoke one or more of the returned web services using the knowledgebase model, such as the semantic and syntactic specifications, as a guideline for invocation of the returned web services.

Domain knowledge experts can provide information, such as the knowledgebase models, to the knowledgebase. If a service provider or requestor cannot locate a desired web service or knowledgebase model, the service provider or requestor can interact with the domain knowledge experts through an interface to request the desired web service or knowledgebase model.

These and other objects, features, and advantages of the renovated web service architecture and management systems and methods will become more apparent upon reading the following specification in conjunction with the accompanying drawing figures.

DETAILED DESCRIPTION

To facilitate an understanding of the principles and features of the web service architecture and web service registry system and methods, various illustrative embodiments are described below. In particular, the invention is described in the context of being a system for managing web services having structured and organized knowledgebase models. Embodiments of the invention, however, are not limited to this context, but can be used for managing services of various types having defined specifications.

The components described hereinafter as making up various elements of the web service architectures, and web service registry system and methods, are intended to be illustrative and not restrictive. Many suitable components that would perform the same or similar functions as the components described herein are intended to be embraced within the scope of the invention. Such other components can include, for example, components developed after development of the invention.

Referring now to the figures, wherein like reference numerals represent like parts throughout the views, embodiments of the web service architecture and its systems and methods will be described in detail.

Figure 1:
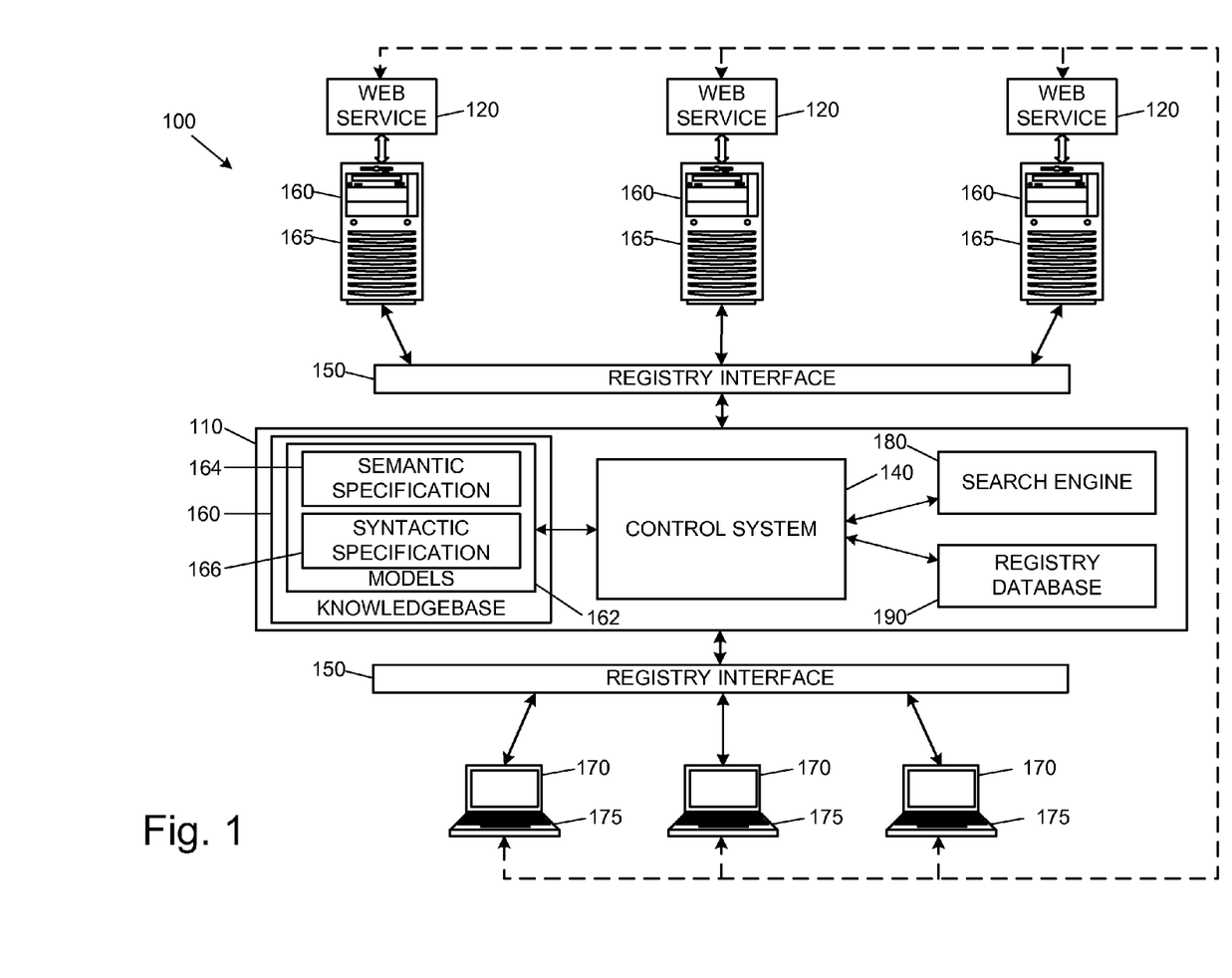
FIG. 1 illustrates a diagram of a web service architecture, according to an exemplary embodiment of the present invention.

FIG. 1 illustrates a diagram of a web service architecture 100, according to an exemplary embodiment of the present invention. As shown in FIG. 1, a web service architecture 100 can comprise a web service registry 110, a plurality of web services 120, a plurality of service providers 130, a plurality of service requestors 140, and one or more registry interfaces 150.

The plurality of web services 120 can be registered to the web service registry 110, which can publish registered web services 120. Service providers 130 can offer web services 120 for publication in the web service registry 110. Service requestors can discover and use web services published to the web service registry 110.

Service providers 130 and service requestors 140 can utilize computer systems to interact with the web service registry 110 to publish and locate web services 120 in accordance with regulations of the web service registry 110. For the sake of simplicity, the computer systems of service providers 130 are illustrated as servers 135. In contrast, the computer systems of service requestors 140 are illustrated as clients 145. It will be understood, however, that computer systems can serve multiple functions. Therefore, a computer system of a service provider 130 can behave as a client 145 in some instances, and a computer system of a service requestor 140 can behave as a server 135 in some instances. Although the computer systems of service providers 130 and service requestors 140 look different from each other in FIG. 1, there is no requirement that this be the case in an embodiment of the web service architecture 100. Further, despite the apparent similarity across service provider 130 computer systems in FIG. 1, different types of computer systems can be used by different service providers 130. Analogously, despite the apparent similarity across service requestor 140 computer systems in FIG. 1, different types of computer systems can be used by different service requestors 140.

In an exemplary embodiment, one or more portions of the web service registry 110, system, and method can operate on one or more computer systems, such as servers 135 and clients 145, and can be stored as computer-readable instructions on at least one computer storage medium. The computer storage medium can be in communication with or connected to the computer system. The instructions for operating and implementing the web service registry 110, system, and method can be executed by a computer processing unit associated with the web service registry 110. In some exemplary embodiments, the web service registry system can be implemented on a Visual Studio .NET platform. For example, and not limitation, a server 135 of the web service registry 110 can comprise a Pentium-4 3.0 GHz computer processor with 2 GB of RAM, running Microsoft Windows Server 2003. In some other exemplary embodiments, however, servers 135 with other specifications can be used.

As shown in FIG. 1, an exemplary embodiment of the web service registry 110 can comprise a knowledgebase 160, a control system 170, a search engine 180, and a registry database 190.

Figure 3:
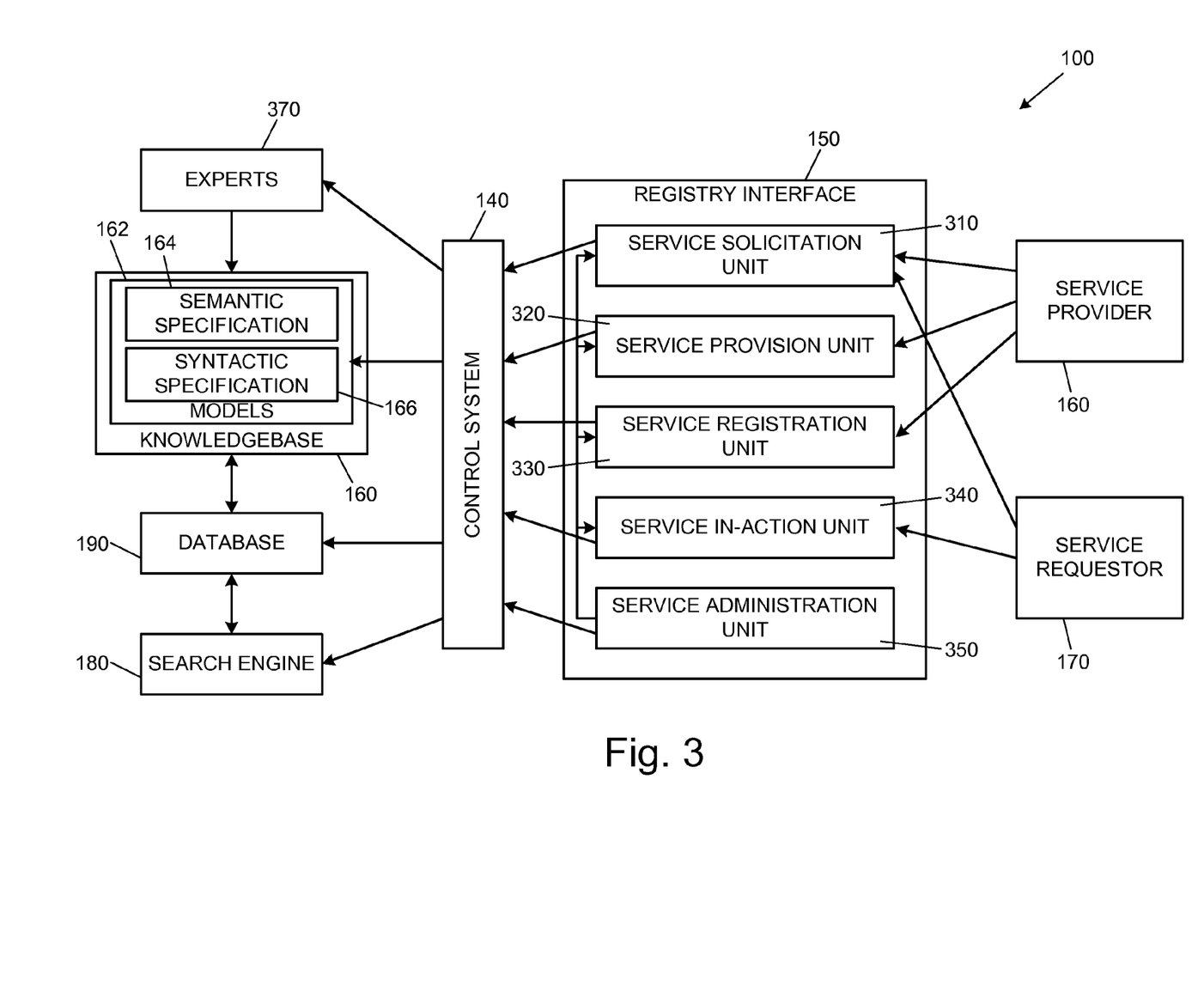
FIG. 3 illustrates a block diagram of various interactions between parties and components of the web service architecture, according to an exemplary embodiment of the present invention.

The knowledgebase 160 can maintain domain knowledge for use in the web service architecture 100. In an exemplary embodiment, data can be provided to the knowledgebase by domain knowledge experts 370 (FIG. 3). The knowledgebase can include, for example, a plurality of knowledgebase models 162 describing one or more web services 120 in the web service architecture 100. A knowledgebase 162 can comprise a semantic specification 164 and a syntactic specification 166. The semantic specification 164 can describe a meaning and purpose of a web service 120, while the syntactic specification 166 can define a syntactic interface for a web service 120. In an exemplary embodiment, the knowledgebase 160 can be stored in the registry database 190 or another database associated with the web service registry 110.

Although the semantic specification 164 and the syntactic specification 166 of a knowledgebase 162 can be inherently independent from each other, the knowledgebase 162 can create a correspondence between the semantic specification 164 and the syntactic specification 166. In an exemplary embodiment, the web service registry 110 can reject web services 120 that fail to comply with a knowledgebase 162 by implementing a semantic specification 164 and its corresponding syntactic specification 166, as defined by a knowledgebase 162 associated with the web service registry 110.

Figure 2:
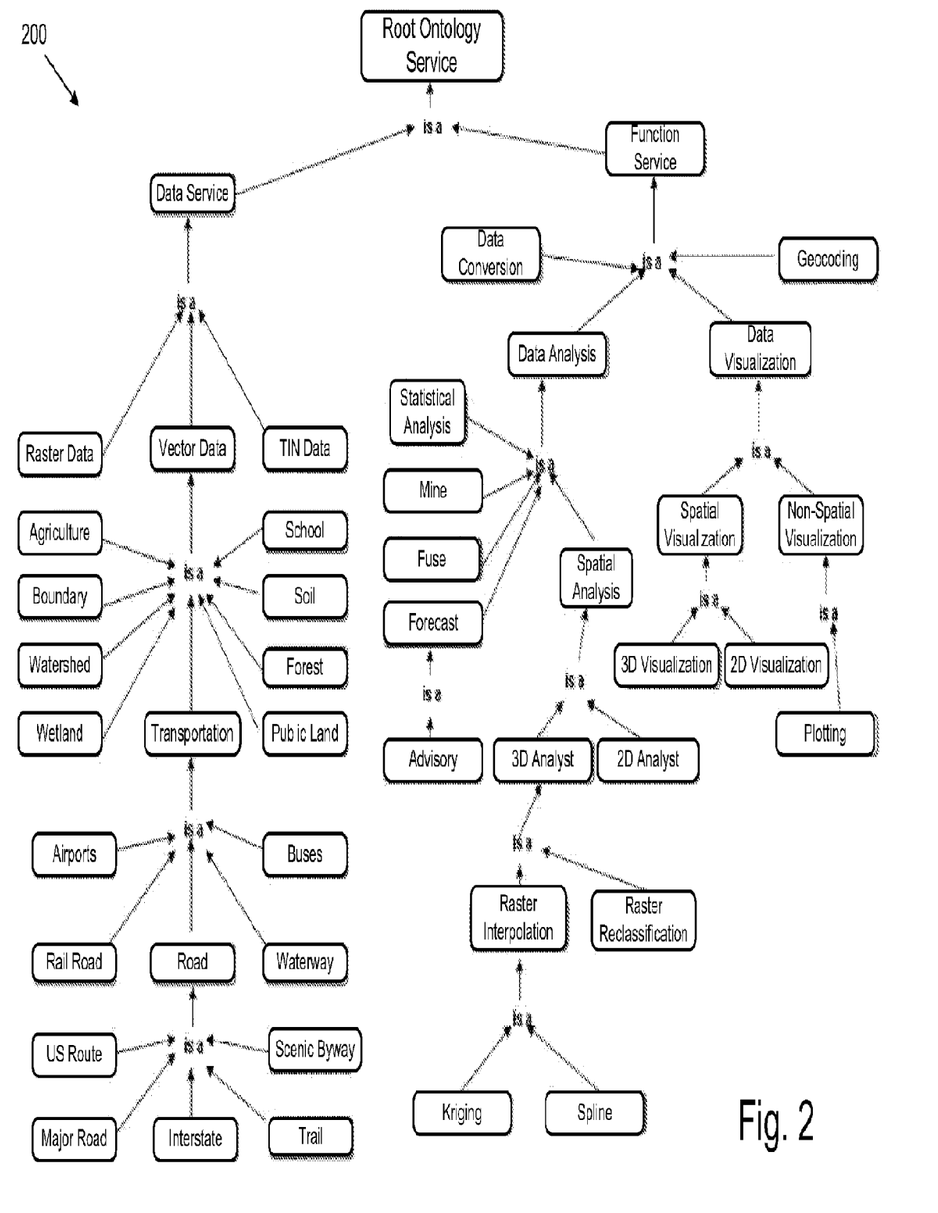
FIG. 2 illustrates a diagram of an exemplary ontology framework for defining semantic specifications, according to an exemplary embodiment of the present invention.

The knowledgebase 160 can include an ontology framework from which the semantic specifications 164 in the knowledgebase models 162 can be formulated. FIG. 2 illustrates an exemplary ontology framework 200 for web services 120 related to domain-specific knowledge, such as the Geographic Information Science ("GIScience"). The ontology framework 400 can provide a standard vocabulary for representing and communicating GIScience domain knowledge, which can be beneficial to successful web service 120 discovery.

A semantic specification 166 can define a concept of a web service 120, and can describe relationships between web services 120. Semantic specifications 166 can be used for service discovery, by matching search terms with the semantic specifications 166. Semantic specifications 166 can cover the hierarchy and relationships among the concepts about data and functional modules within an ontology framework 200. As a result, search queries can be more accurately interpreted and more effectively applied to semantic specifications 166 associated with the web service registry 110. Semantic specifications 166 for GIScience or other domain-specific web services 120 can include, for example, scientific descriptions, data and service characteristics, spatial coverage, temporal scope, and comprehensive lineage specifications, one or more of which can be available for search. Semantic specifications 164 in the knowledgebase 160 can be described in various formats, such as, for example, Web Ontology Language ("OWL"), Unified Modeling Language ("UML"), Extensible Markup Language ("XML"), database, graphics, or a combination of these or other formats.

One or more web services 120 published to the web service registry 110 can comply with knowledgebase models 162 and, more specifically, semantic specifications 164 in the knowledgebase 160. In an exemplary embodiment, each web service 110 published to the registry 110 can comply with a knowledgebase 162, or can be subject to removal for non-compliance. A web service 120 complying with a semantic specification 164 can be referred to as a semantically-defined web service 120.

The knowledgebase 160 can also include syntactic specifications 164, which can be combined with semantic specifications 166 to form the knowledgebase models 162 for various types of web services 120. A syntactic specification 166 can define an interface definition for a web service 120. For example, a syntactic specification 166 can describe information about input variables, expected outcomes, data types and structures, naming framework, operations, and possible error messages returned. A syntactic specification 166 can instruct service requesters 140 in how to call a web service 120 through a URL or application program interface ("API"). Providing a standard syntactic specification 166 for similar web services 120 can enable dynamic service invocation by making the calling format of similar web services 120 interchangeable. As a result, a service requestor 140 using an application to utilize a particular type of web service can swap between similar web services 120 offered by different service providers 130 without reprogramming the application. Thus, the service requestor 140 can dynamically invoke web services 120. Syntactic specifications 166 in the knowledgebase 160 can be described in various formats, such as WSDL or other XML formats.

Each semantically-defined web service 120 can have a unique identifier for internal organization and management of the knowledgebase 160 and the registry database 190. Correspondingly, each semantically-defined web service 120 can have a syntactic specification 164 corresponding to a semantic specification 166 in a knowledgebase 162. Service semantics in a semantic specification 164 are, in general, neutral and independent from service interface definitions in a syntactic specification 166. A semantically defined web service 120 can have a syntactic interface defined by either a structured URL or an API in WSDL. Both semantic specifications 164 and syntactic specifications 166 can be beneficial in a knowledgebase 162. Semantic specifications 164 can enable the service discovery, while syntactic specifications 166 can enable dynamic service invocation by providing standard syntactic interfaces.

The control system 170 can be an entry point to access the web service registry 110 through the registry interface 150. The control system 170 can process an incoming request sent to the web service registry 110 to determine whether the request is for service discovery, for service publication or registration, or to create a new service category and knowledgebase model 162. The control system 170 can dispatch the requested job to specific components for execution.

The control system 170 can enforce the knowledgebase models 162 by actively supervising and managing incoming web services 120, registered web services 120, or both. The control system 170 can examine an incoming web service 120, such as a web service 120 submitted for new registration, to determined whether the web service 120 complies with a knowledgebase 162. If the incoming web service 120 is operative and complies with a knowledgebase 162 associated with the web service registry 110, the incoming web service 120 can be published to the web service registry 110. Otherwise, the incoming web service 120 can be rejected and not published in the web service registry 110. Additionally, the control system 170 can periodically examine registered web services 120 to confirm that they still comply with the knowledgebase models 162, and that they remain operative. If a registered web service 120 is found inoperative or fails to comply with a knowledgebase 162, that web service 120 can be flagged for removal or immediately removed from the web service registry 110.

A web service 120 can be deemed inoperative if it fails a predetermined number of functionality tests, which can be based on a data template received from a service provider when initially registering the web service. In an exemplary embodiment, a web service can be deemed inoperative after five failed functionality tests.

The search engine 180 can locate web services 120 and knowledgebase models 162 requested by users 130 and 140 of the web service registry 110. The search engine 180 can use the conceptual definitions in the semantic specifications 164 to provide keyword or semantic searches of web services 120 published in the web service registry 110. The search engine 180 can have multiple components, such, for example, a query translation engine, a query processor and inference engine, and a query interpretation engine. A semantic search query can be executed through a multi-step process in the search engine 180.

The query translation engine can transform a user's search criteria, which can composed, for example, by a user interface or an API, into a formal semantic query format. The query processor and inference engine can parse the knowledgebase 160 according to the search criteria to generate intermediate results. In some exemplary embodiments, the intermediate results can be generated in a structured hierarchical format. The query interpretation engine can generates SQL commands from the intermediate results to search the registry database 190 for knowledgebase models 162 and/or web services 120 matching the search criteria. Finally, the final results can be returned to the user 130 or 140, such as through the web or through an API. The search engine 180 and query processes of the search engine 180 can be enhanced through various means, such as natural language processing, pattern cognition, and statistical modeling.

If the search engine 180 identifies a registered web service 120 matching the user's search criteria, final results can be returned to the user 130. The final results can include at least a knowledgebase model, which can be used for calling or developing the web services. The final results can also include a list of service providers 130 offering the web service 120, and the locations of such offerings. In some exemplary embodiments, the list of service providers 130 and web service locations can be provided in response to requests from service requestors 140 who indicate a desire to consume a web service 120. In contrast, service providers 130, who desire to develop a web service, need not receive a list of service providers 130 and web service locations.

The registry database 190 can store various data associated with the web service registry 110. In an exemplary embodiment of the web service registry 110, the registry database 190 can be a relational database. The registry database 190 can store and maintain, for example, contents of the knowledgebase models 162, locations of registered web services 120, and information about service providers 130 offering the web services 120. The registry database 190 can be updated when new content is added to the knowledgebase 160, and when web services are newly registered to the web service registry 110. As necessary for operation of the web service registry 110, the database 190 can be accessible and searchable by various users, support agents, and other parties associated with the web service architecture 100.

The database can maintain a database record for each web service 120 in the web service registry 110. The database record for a web service 120 can contain a knowledgebase 162 corresponding to the web service 120, and references to instances of the web service. Multiple providers 130 can register and publish the same web service 120 in the web service registry 110. In that case, the database record for the registered web service 120 can contain a service provider 130 and location for each instance of the web service 120 in the web service registry 110. One or more, and preferably all, instances of registered web services 120 can have unique identifications, such as identification strings or numbers, also recorded in the database 190. The identifications can be independent from the knowledgebase models 162 corresponding to those web services 120. While each knowledgebase 162 can describe one or multiple instances of registered web services 120, each identification can be unique for each web service 120 instance. The identification for each instance of a web service 120 can be consistent throughout the system lifecycle.

FIG. 3 illustrates a block diagram of various interactions between parties and components of the web service architecture 100, according to an exemplary embodiment of the present invention. It will be understood that the various interactions illustrated in FIG. 3 are illustrative and not restrictive, and other interactions can occur in the web service architecture 100.

As shown in FIG. 3, various interactions in the web service architecture 100 can occur through the registry interface 150. The registry interface 150 can comprise one or more units for interactions between users 130 and 140 and the web service registry 110. Such units can be interfaces, modules, applications, devices, systems, services, or combinations or portions thereof. The units of the registry interface 150 can include, for example, a service solicitation unit 310, a service provision unit 320, a service registration unit 330, a service in-action unit 340, and a service administration unit 350. Each of these units can have a web interface, an API, or both for interactions with users 130 and 140 of the web service registry 110.

The service solicitation unit 310 can receive requests from service requesters 140 soliciting new web services 120. A service requestor 140 can opt to solicit a new web service 120 through the service solicitation unit 310 when, for example, the service requestor is unable to locate the desired web service 120 in the web service registry 110. The solicitation unit 310 can publish service solicitations describing needs of service requestors 140. When a service requestor 140 fails to locate a desired web service 120 in the web service registry 110, the service requestor 140 can send a request to the web service registry 110 for the desired web service 120. Through the solicitation unit, the service requester 140 can describe the desired web service 120. For example, the service requestor 140 can complete a template or form to describe a semantic specification 164 for the desired web service 120 by specifying whether the desired web service 120 is a new service category or a sub-domain of an existing, semantically-defined web service 120 within the knowledgebase 160. In some exemplary embodiments, the solicitation unit 310 can also allow the service requester 140 to specify a desired syntactic interface definition for a syntactic specification 166 of the desired web service 120.

The information received from the service requestor 140 through the solicitation unit 310 can be transmitted to the domain knowledge experts 370. The domain knowledge experts 370 can approve or disapprove the new solicitation. If the solicitation is approved, a new knowledgebase 162 for the solicited web service 120 can be integrated into the knowledgebase 160. As applicable, either or both of the knowledgebase 160 and the registry database 190 can be updated to reflect the new knowledgebase 162. Then, the knowledgebase 162 and the description of the desired web service 120 can be reviewed and accessed through the registration unit 330 by service providers 130 who may choose to develop a web service 120 in accordance with the solicitation. If a web service 120 is later registered to the web service registry 110 and meets the criteria of the solicitation, the solicitation can then be removed from the knowledgebase 160 and the solicitation unit 310, and the content of the service in-action unit 340, which will be described further below, can be updated to reflect the new web service 120.

The service provision unit 320 can receive requests from service providers 130 having the capability to develop web services 120 that do not yet have corresponding knowledgebase models 162 recorded in the knowledgebase 160. The service provision unit 320 can receive a description of a potential new web service 120. For example, the service provision unit 320 can provide a template, through which the service provider 130 can describe the potential new service 120 through filling out a template to describe a semantic specification 164 for the potential new web service 120. The service provider can specify whether the potential new web service 120 is a new service category or a sub-domain of an existing, semantically-defined web service 120 within the knowledgebase 160. In some exemplary embodiments, the service provider 130 can also specify a desired syntactic interface definition for a syntactic specification 164 of the potential new web service 120.

The information received from the service provider 130 through the service provision unit 320 can be transmitted to the domain knowledge experts 370 as a new provision request. The domain knowledge experts 370 can approve or disprove the new provision request. If the provision request is approved, a new knowledgebase 162 corresponding to the potential new service can be integrated into the knowledgebase 160. As applicable, either or both of the knowledgebase 160 and the registry database 190 can be updated with the new knowledgebase 162, and a description of the potential new service can be reviewed and accessed through the service registration unit 330. Based on the description and the new knowledgebase model, service providers 130 can develop new web services 120. If a new web service 120 corresponding to the description and knowledgebase 162 is later registered to the web service registry 110, the provision request can be removed from the knowledgebase 160 and the service provision unit 320. The content of the service in-action unit 340, which will be described further below, can updated to reflect the new web service 120.

The service registration unit 330 can receive registration submissions from service providers 130. When a service provider 130 desires to register a web service 120, the service provider can submit information about the web service 120 to the service registration unit 330. The service registration unit 330 can collect certain information from the service provider 130, including an indication of the applicable semantic specification 164 or knowledgebase model 162 for the web service 120. The service registration unit can also receive from the service provider 130 a sample data template for confirming that the web service 120 is operative. The data template can be used to verify that the new web service 120 operates properly and complies with the syntactic specification 166 in the indicated knowledgebase 162. Additionally, when the control system 170 periodically checks whether the web services 120 registered to the registry perform properly, the data template can be utilized by the control system 170 to confirm that registered web services 120 continues to function as intended.

The service in-action unit 340 can be a gateway for peers to search for desired web services 120 or knowledgebase models 162. To perform various searches for desired web services 120, the service in-action unit 340 can collect information about the desired web services 120. The service in-action unit 340 can enable various types of searches, such as a keyword search or a search with categorized terminologies. Search information received through the service in-action unit 340 can be directed to the search engine 115 for processing. If a desired web service 120 or knowledgebase 162 is identified by the search engine, the search results can be returned through the service in-action unit 340. As described above, the search results can include knowledgebase models 162, locations of matched web services, and service providers 130 offering the matched web services 120.

The service administration unit 350 can provide technical and customer service support. The service administration unit 350 can provide internal administration services to operate and maintain the web service registry 110. In some exemplary embodiments, however, the service administration unit 350 can also provide support to users 350. Such support can be provided through automated support services, human support agents, or both. The service administration unit 350 can provide support applicable to one or more of the various other units 310, 320, 330, and 340 of the registry interface 150 or other aspects of the web service registry 110.

Figure 4:
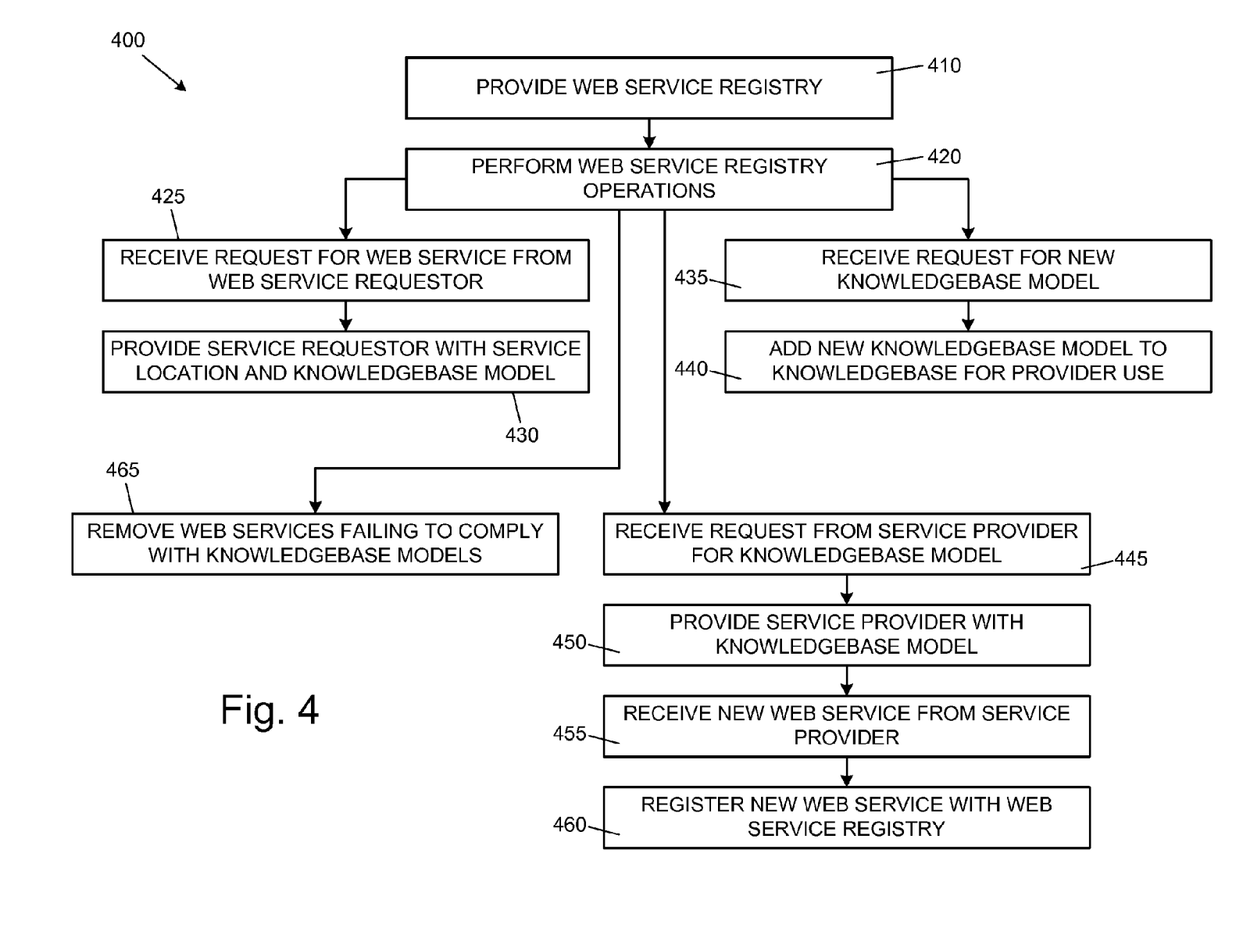
FIG. 4 illustrates a flow diagram of a method of operating the web service registry, according to an exemplary embodiment of the present invention.

FIG. 4 illustrates a flow diagram of an exemplary method 400 of operating a web service registry 110, according to an exemplary embodiment of the present invention. As discussed above, one or more of the operations described as performed by or in the web service registry 110 can be performed by the control system 170.

It will be understood that the method illustrated in FIG. 4 is illustrative and not restrictive. Therefore, although only certain method steps are show in FIG. 4, other steps can be include din a method of operating the web service registry 110. Additionally, not all method steps included in FIG. 4 need be required in every embodiment of the web service registry 110. It will be further understood that the method steps illustrated in FIG. 4 need not necessarily occur in the order presented.

As shown in FIG. 4, at 410, a web service registry 110 can be provided, preferably based on the knowledgebase models 162 in the knowledgebase 160. At 420, various operations can be performed within the web service registry 110, such as through the control system 170. For example, at 425, a request for a desired web service 120 can be received from a service requestor 140. At 430, the service requestor can be provided with knowledgebase 162 for the desired web service 120, as well as a list of service providers 130 and locations of available web services matching the desired web service 120. Returning back to 420, other operations can also be performed in the web service registry 110. For example, at 435, a request for new knowledgebase 162 can be received, and at 440, a new knowledgebase 162 can be provided to the knowledgebase 160 for service providers 130 to use. In an exemplary embodiment, the new knowledgebase 162 can be provided to the knowledgebase 160 by a set of domain knowledge experts 370. Further operations of the web service registry 110 can be performed 420. For another example, at 445, a request can be received from a service provider 130 for a knowledgebase 162, such as for the purpose of developing a web service 120. At 450, the web service registry 110 can provide the service provider 130 with the requested knowledgebase 162, if such a knowledgebase 162 exists in the knowledgebase 160. At 455, a web service 120 can be received for a new registration. If the received web service 120 meets all criteria for registration, the received web service 120 can be published to the registry 460. Such criteria for registration can include compliance with a knowledgebase 162. Further operations of the web service registry 110 can be performed 420. At 465, web services 120 failing to comply with the knowledgebase models 162 can be removed from the web service registry 110.

Accordingly, as described above, exemplary embodiments of the web service architecture 100, systems, and methods can be used to manage web services 120 for effective discovery and invocation of web services 120.

While embodiments of the web service architecture 100, systems, and methods have been disclosed in some exemplary forms, many modifications, additions, and deletions can be made without departing from the spirit and scope of the web service architecture 100, systems, and methods, and their equivalents, as set forth in the following claims.

What is claimed is:

1. A computer-based web service registry system comprising:
   a web service registry that, based on a knowledge base comprising a plurality of knowledge base models, registers and discovers a plurality of web services, and rejects for publication each of a plurality of non-compliant web services failing to comply with the plurality of knowledge base models,
      wherein each of the knowledge base models comprises both a semantic specification providing a semantic meaning for an associated web service and a syntactic specification for the associated web service separate from the semantic specification, and
      wherein the web service registry provides service discovery based on the semantic specifications of the plurality of knowledge base models, and provides dynamic service invocation based on the syntactic specifications of the plurality of knowledge base models;
   a control system with a computer processor that identifies the plurality of non-compliant web services before they publish to the web service registry; and
   an interface that receives a request from a service provider to develop a new web service not complying with the plurality of knowledge base models,
      wherein the web service registry updates the knowledge base in response to the request by including in the knowledge base a new knowledge base model for the new web service, the new knowledge base model comprising a new semantic specification and a new syntactic specification,
      wherein the interface presents the service provider with the new knowledge base model upon updating the knowledge base.

2. The computer-based web service registry system of claim 1, the control system that further identifies and removes inoperative web services from the web service registry.

3. The computer-based web service registry system of claim 2, the control system that further periodically searches the web service registry for web services that are inoperative.

4. The computer-based web service registry system of claim 1, further comprising a graphical user interface and an application programming interface that receive a registration request for a new web service.

5. The computer-based web service registry system of claim 4, the web service registry rejecting the registration request if the new web service is a non-compliant web service.

6. The computer-based web service registry system of claim 4, the registration request comprising a sample data set for determining whether the new web service is operative.

7. The computer-based web service registry system of claim 6, the web service registry rejecting the registration request if the new web service is deemed inoperative based on the sample data set.

8. The computer-based web service registry system of claim 1, further comprising a search engine that performs a semantic search query, based on the semantic specifications of the plurality of knowledge base models preexisting in the web service registry, to locate a web service registered to the web service registry.

9. The computer-based web service registry system of claim 8, the search engine that performs natural language processing, based on the semantic specifications of the plurality of knowledge base models preexisting in the web service registry.

10. A computer program product comprising a non-transitory computer-readable medium that stores instructions executable by one or more processors to perform a method for managing a web service registry, the method comprising:
    registering a plurality of web services to the web service registry, the plurality of web services being compatible with a plurality of semantic specifications and a plurality of syntactic specifications in a knowledge base associated with the web service registry;
    providing a search engine that searches the plurality of web services based on the plurality of semantic specifications in the knowledge base;
    receiving a proposal from a service provider for a new web service concept that is incompatible with the plurality of semantic specifications and the plurality of syntactic specifications;
    updating the knowledge base by including a new semantic specification and a new syntactic specification in the knowledge base in addition to the plurality of semantic specifications and syntactic specifications, according to the received proposal;
    publishing to the web service registry a new web service if the new web service complies with the plurality of semantic specifications and syntactic specifications, or the new semantic specification and the new syntactic specification, in the updated knowledge base; and
    rejecting the new web service if the new web service fails to comply with the plurality of semantic specifications and syntactic specifications, and fails to comply with the new semantic specification and the new syntactic specification.

11. The computer program product of claim 10, the method further comprising providing a search engine that performs a semantic search query to identify the new semantic specification as complying with the updated knowledge base.

\* \* \* \* \*